United States Patent [19]
Bokowski et al.

[11] Patent Number: 4,713,572
[45] Date of Patent: Dec. 15, 1987

[54] ULTRASONIC TRANSDUCERS FOR ON-LINE APPLICATIONS

[75] Inventors: Gary A. Bokowski; David W. Vahey, both of Columbus, Ohio

[73] Assignee: AccuRay Corporation, Columbus, Ohio

[21] Appl. No.: 872,049

[22] Filed: Jun. 6, 1986

[51] Int. Cl.$^4$ ............................................. H01L 41/08
[52] U.S. Cl. .................................. 310/323; 310/321; 310/328; 310/334; 310/336; 73/644
[58] Field of Search ................................ 310/334–336, 310/328, 321–324; 73/624, 625, 632, 642, 644

[56] References Cited

U.S. PATENT DOCUMENTS

| 2,460,153 | 1/1949 | Smoluchowski | 310/336 |
| 2,666,862 | 1/1954 | Branson | 310/336 |
| 3,416,012 | 12/1968 | Jackson | 310/336 |
| 3,792,294 | 2/1974 | Royer . | |
| 4,101,795 | 7/1978 | Fukumoto et al. | 310/336 |
| 4,291,577 | 9/1981 | Baum et al. . | |
| 4,509,153 | 4/1985 | Weight . | |
| 4,562,372 | 12/1985 | Nakamura et al. . | |
| 4,603,276 | 7/1986 | Coursant | 310/334 |

OTHER PUBLICATIONS

Warren P. Mason, *Physical Acoustics*, vol. 1, pp. 225–226, 1964, Murray Hill, New Jersey.
Gary A. Baum and Charles C. Haberger, Jr., *On-Line Measurement of Paper Mechanical Properties*, pp. 20 & 22, Institute of Paper Chemistry, May 15, 1985, Appleton, Wisconsin.

*Primary Examiner*—Mark O. Budd
*Attorney, Agent, or Firm*—Joseph R. Black, Jr.

[57] ABSTRACT

A transducer for transmitting or receiving ultrasound in on-line applications is disclosed. The transducer comprises a piezoelectric element having the shape of a parallelepiped, and a nosepiece rigidly attached to a surface of the element and adapted for contact with sheet material through which ultrasound is propagated.

19 Claims, 10 Drawing Figures

ULTRASONIC TRANSDUCERS FOR ON-LINE APPLICATIONS

BACKGROUND OF THE INVENTION

1. Field of the Invention

This invention relates to transducers for use in transmitting or receiving ultrasound that is propagated through sheet material in on-line applications. More particularly, the invention relates to such transducers that employ a piezoelectric element having the shape of a parallelepiped and being separated from the sheet material by a protective nosepiece that is ridigly attached to the element and adapted for contact with the sheet material.

2. Description of Prior Art

On-line applications for transducers have typically employed cylindrical piezoelectric elements, although elements having numerous other shapes, including that of a parallelpiped, are known. It is also known that in on-line applications it is desirable to separate the element from the sheet material in order to preserve the useful properties of the element.

U.S. Pat. No. 3,792,294 Royer describes a rectangular AT-cut quartz resonator designed for the frequency range of 1 to 6 MHz and having a prescribed length-to-thickness ratio, width-to-thickness ratio, and orientation in order to eliminate the effects of combination of vibration modes.

U.S. Pat. No. 4,509,153 Weight described several ultrasonic transducers designed to transmit or receive "edge waves" without substantial transmission or reception of "plane waves." Although the invention describes circular sources of propagation, it suggests that the active surfaces of the source may follow two parallel lines (Col. 9, 1. 21–23).

U.S. Pat. No. 4,562,372 Nakamura, et al. describes a piezoelectric vibrating element of rectangular configuration for which width-to-length ratios are selected to correspond to the negative peaks of capacitance ratios in an equivalent circuit.

U.S. Pat. No. 4,291,577 Baum, et al. describes a transducer used in an on-line application that transmits ultrasound into sheet material and receives ultrasound therefrom. The transducer uses two piezoelectric elements with an electrode between the two, and an aluminum button through which ultrasound is transmitted to and from the sheet. The piezoelectric elements are described as sandwiched between the aluminum button and an aluminum ballast, and the shape of the elements is not specifed. As practiced, the invention employs cylindrical elements.

In on-line applications transducers typically use cylindrical piezoelectric elements that produce either a radial motion or a piston-like motion that is perpendicular to the sheet and that produces flexural waves in flexible sheet material. In both cases, compressional and shear waves are produced as primary or secondary vibrational effects. In any radial direction, a receiving transducer therefore detects both modes of propagation in the plane of the sheet, making it difficult to derive a measurement based on a particular mode.

The transducers of the instant invention produce resonant vibration such that, when two receiving transducers are positioned relative to a transmitting transducer as hereinafter described and all are in simultaneous contact with the sheet material, each receiving transducer detects ultrasonic waves of predominantly one mode of propagation.

SUMMARY OF THE INVENTION

This invention provides transducers for transmitting ultrasound into sheet material or receiving ultrasound therefrom in an on-line application, which transducers comprise a piezoelectric element having the shape of a parallelepiped with corresponding dimensions of length, width, and thickness, and having an electrode film deposited on first and second surfaces whose dimensions are the length and width of the element, and a nosepiece having both a joining surface that is rigidly attached to the second surface of the element and a contacting surface for contact with the sheet material.

The transducer will typically have a length to width ratio of at least two-to-one. On-line peformance of the transducer will be enhanced where the length of the nosepiece, or at least a portion thereof, bears substantially the same ratio to the length of the element as the speed of ultrasound through the nosepiece bears to the speed of ultrasound through the element.

A portion of the nosepiece may be rounded or beveled to prevent damage to the sheet material. The contacting surface of the nosepiece may be rectangular, spherically convex, or otherwise shaped to suit a particular application for the transducer. In certain applications, particularly where flexible sheet material such as paper is involved, the nosepiece may have two separate contacting surfaces for simultaneous contact with the sheet material. The contacting surface or surfaces may be confined to locations near one or both longitudinal extremes of the nosepiece where vibrational effects are near maximum.

Since the primary purpose of the nosepiece is to protect the element in a rigorous on-line environment, the nosepiece may be metallic. Its joining surface may or may not entirely cover the second surface of the element. Where the joining surface does not entirely cover the second surface, the remainder of the second surface will typically be covered by a non-conductive material.

An object of the invention is to provide transducers that will withstand the rigors of an on-line environment and that have vibrational characteristics such that in an on-line application where two or more transducers are employed to measure a physical parameter of sheet material, all transducers which receive ultrasound that is propagated through the sheet can be positioned relative to a transmitting transducer so that each detects ultrasonic waves of predominantly one propagation mode.

Another object of the invention is to provide transducers that more efficiently transmit ultrasound through, or receive ultrasound from sheet material in on-line applications than prior transducers.

A third object of the invention is to provide transducers which minimize damage to moving sheet material with which they come into contact in on-line applications.

BRIEF DESCRIPTION OF THE DRAWINGS

FIGS. 5(b) and 5(c) show the nosepiece combined with the piezoelectric element.

DETAILED DESCRIPTION

Figure 1:
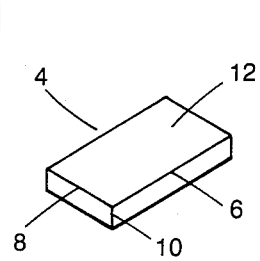
FIG. 1 is a perspective view illustrating the general shape of a piezoelectric element used in accordance with the invention. Also shown is a directional reference for purposes of description.
Figure 2:
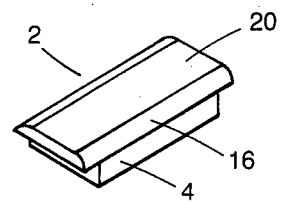
FIG. 2 is a perspective view of an embodiment of the invention.

Referring to FIGS. 1 and 2, the transducer 2 includes a piezoelectric element 4 which may be made of, for example, a lead zirconate-lead titanate ceramic. The element 4 has the shape of a parallelepiped with dimensions of length, width, and thickness (in descending order) indicated by numerals 6, 8, and 10, respectively. Although many combinations of such dimensions will produce elements that operate in accordance with this invention, the nominal dimensions in the current design are one inch, one-fourth inch, and one-eighth inch for length, width, and thickness. An electrode film (not shown) is deposited by conventional means on a first surface 12 and an opposite, second surface 14 (FIG. 3) whose dimensions are the length and width of the element 4. A nosepiece 16 is rigidly attached to the element 4 by means of an adhesive, preferably a conductive epoxy. Attachment is made between a joining surface 18 (FIG. 3) of the nosepiece 16 and the second surface 12 of the element 4. Electrical contact between the electrode film on the second surface 12 and external electrical communication means may be provided, for example, by a protruding glob of conductive epoxy. Where the width of the joining surface 18 is less than the width of the second surface 12, it is preferable to cover the remainder of the second surface 14 with a nonconductive material such as RTV. On the side of the nosepiece generally opposite the joining surface 18 is a contacting surface 20 for contact with a medium through which ultrasound is propagated.

When an appropriate voltage pulse is applied across the first and second surfaces 12, 14, the element 4 will undergo resonant vibration in the direction of its longitudinal axis (x direction, FIG. 1). For an element of this configuration, the resonant frequency is given by the following formula:

$$f = v/2l$$

where v is the velocity of ultrasound in the element 4, and l is the length. If the transducer 2 is placed in contact with sheet material and a second, receiving transducer contacts the sheet along the longitudinal axis of the transducer 2, the receiving transducer will detect ultrasonic waves that are predominantly compressional. If a third, receiving transducer contacts the sheet along the transverse axis of the transducer 2, it will detect ultrasonic waves that are predominantly shear waves.

Figure 3:
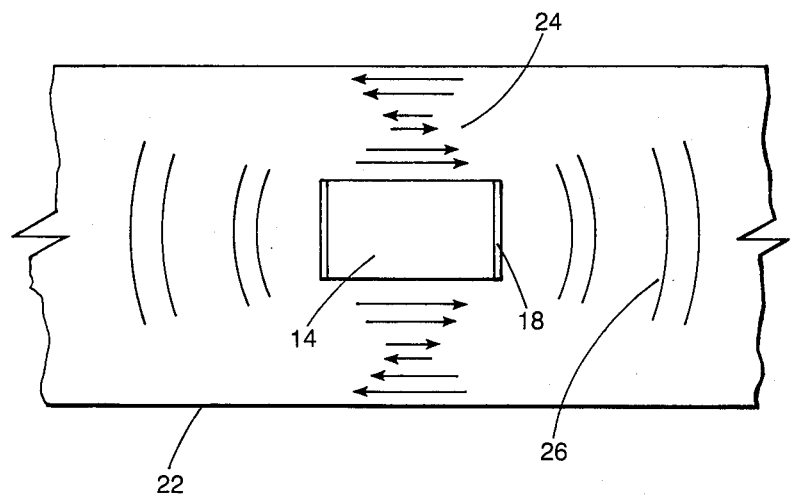
FIG. 3 is a schematic illustration of two modes of wave propagation associated with resonant vibration of the element of FIG. 1.

FIG. 3 schematically illustrates the wave propagation associated with x-direction vibration of the element 4. The sheet material 22 is in contact with the transducer 2 at the contacting surface 20 (FIG. 2) of the nosepiece 16. Shear waves (indicated as 24) and compressional or longitudinal waves (indicated as 26) propagate through the sheet 22 in generally the y and x directions, respectively.

Figure 4:
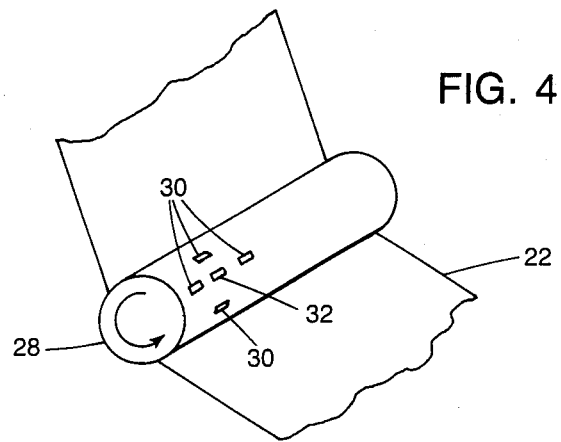
FIG. 4 is a partially schematic illustration of an on-line application for the invention.

An advantage of the described element 4 in an online application is illustrated in FIG. 4 wherein the numeral 28 designates a rotating cylinder that is in contact with and partially wrapped by moving sheet material 22. A plurality of receiving transducers 30 are mounted in the cylinder 28 at known distances from a transmitting transducer 32. Thus, propagation of shear waves is detected in the machine direction and propagation of longitudinal waves is detected in the cross-machine direction. Although not illustrated, the alignment of the transducers 30, 32 could be changed ninety degrees so that the receiving transducers 30 detected waves predominantly associated with the opposite mode of propagation. In the case of a cylindrical element undergoing radial vibration, there are in any given direction compressional waves associated with vibration of the cylindrical element along a first diameter and shear waves associated with vibration along a perpendicular diameter. This mixture of propagation modes is undesirable and may cause serious difficulty in measuring the speed of a particular mode. A piezoelectric element of the above-described configuration therefore has advantages over the cylindrical elements that are typically prescribed for on-line applications.

Although secondary vibrations of the element 4 will occur in the y direction, the effect of the x-direction vibration is predominant in controlling the mode of propagation along the x and y axes. The predominance is observed for length-to-width ratios of at least two-to-one. However, as the ratio drops below two-to-one, the y-direction vibration becomes more important in influencing propagation modes in the x and y directions, thus increasing signal processing requirements and decreasing confidence in the measurement of propagation speed.

Figure 5:
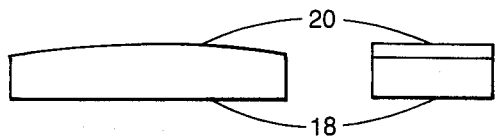
FIG. 5 (a-f) are elevational views of several nosepieces that may be used in accordance with the invention.
Figure 5:
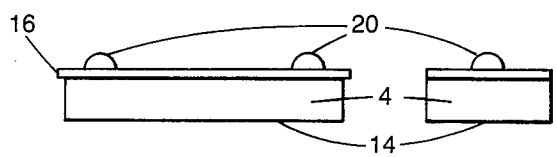
Figure 5:
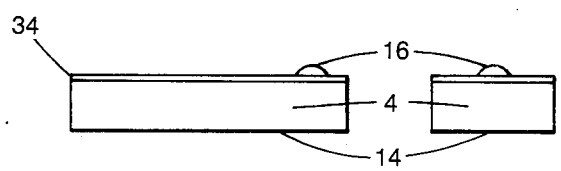
Figure 5:
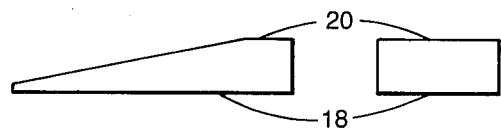
Figure 5:
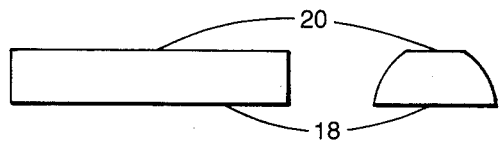
Figure 5:
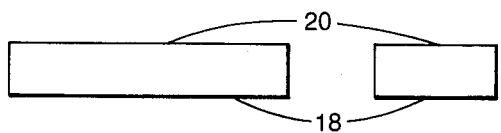

The nosepiece 16 is added primarily to protect the electrode film on the second surface 12 from the wear that would result from continual contact with the sheet 22. The nosepiece 16 may be designed to suit particular applications. Consideration should be given to the physical characteristics of the sheet material 22 with which the nosepiece comes into contact and the geometry used in bringing about such contact. For example, if the sheet material 22 is easily damaged, it will be desirable to provide beveled or rounded portions for the nosepiece 16 as exemplified in FIGS. 2 and 5 (e). Where the transducer 2 is mounted in a cylinder as shown in FIG. 4, the rounded portion may have a radius of curvature approximating that of the cylinder, as indicated in FIG. 5(a) wherein this portion is also the contacting surface 20.

The joining surface 18 of the nosepiece 16 need not be rectangular as indicated in FIG. 3. In FIG. 5(c), for example the nosepiece 16 is a hemisphere whose circular joining surface (not shown) is rigidly attached to the second surface 12 (FIG. 1) of the element 4, thus providing a spherically convex contacting surface 16 that is confined to a longitudinal extreme of the transducer 2 where x-direction vibration is at a maximum. The otherwise exposed portions of the second surface 12 are covered with a non-conductive material 34.

Increased pressure between the contacting surface 20 and the sheet 22 enhances the coupling of ultrasound between the sheet and the transducer 2. The designs of FIGS. 5(c) and 5(d) take advantage of this effect by minimizing the areas of the contacting surfaces. Moreover, when the speed of ultrasound in the sheet 22 is measured from the propagation time between two transducers, confidence in the measurement is decreased by the uncertainty in determining the points of origin and reception of the waves. The designs of FIGS. 5(c) and 5(d) therefore have the added advantage of narrowing the range over which these points can exist.

Conversely, for constant pressure between the contacting surface 20 and the sheet 22, a larger area of contacting surface results in enhanced coupling of ultrasound between the transducer 2 and the sheet. FIG. 5(f) shows a design which takes advantage of this effect. The designs of FIGS. 5(a) and 5(e) incorporate the goals of both minimizing damage to the sheet 22 and improving coupling between the sheet and the transducer 2 by providing a relatively large contacting surface.

When the sheet material 22 is very flexible (e.g. paper) or undergoes a significant degree of flutter near the transducer 2, incidental contact may occur between the sheet and portions of the transducer for which contact is unintended. This is especially true for nosepiece designs having one contacting surface confined to a longitudinal extreme of the transducer. For example, in the design of FIG. 5(c), incidental contact may occur between the sheet 22 and the nonconductive material 34. This can be corrected by providing a second contacting surface 20 near the opposite longitudinal extreme of the transducer as illustrated in FIG. 5(b). Alternatively, the transducer 2 may be tilted with respect to the sheet 22.

A source of difficulty in using the nosepiece 16 is that the x-direction waves will reverberate in both the element 4 and the nosepiece. If these reverberations do not closely coincide, then the x-direction vibration of the transducer 2 may be diminished in amplitude and duration. However, if the length of the nosepiece 16 is selected so that it bears the same ratio to the length of the element 4 as the speed of ultrasound through the nosepiece bears to the speed of ultrasound through the element, then an ultrasonic wave reverberating in the element will generate a corresponding wave in the nosepiece that reverberates with substantially the same periodicity. The vibration of the transducer 2 then compares more favorably with the vibration of the element 4 in isolation. It will be recognized that this relationship cannot be used for some nosepiece designs (e.g. FIG. 5(c)). For others, the relationship will not hold throughout the thickness of the nosepiece 16 as, for example, when the nosepiece is modified by rounding or beveling. However, these modifications can be made without significantly degrading performance of the transducer 2, provided the relationship is maintained at the joining surface 18. It may further be necessary to limit the thickness of the nosepiece 16 in order to realize the advantages of the above relationship, although this limit is as yet undetermined. Nosepiece thicknesses of from 0.03 inches to 0.08 inches have been used with favorable results. However, it is postulated that as the thickness of the nosepiece 16 increases, the x-direction reverberations in the nosepiece will acquire z-direction components which may significantly offset the advantage of coincident reverberations.

Since the primary purpose of the nosepiece 16 is to afford protection against a hostile on-line environment, a metallic nosepiece is preferred. In the current design, brass was selected because the speed of ultrasound therethrough was slightly larger than the speed of ultrasound through the piezoelectric material used. This allows complete coverage of the nosepiece 16 over the second surface 12 of the element 4 without execssive overlap when the above-described length-to-speed relationship is employed. However, any metal with acceptable acoustical propagation properties may be used.

While the invention has been described with reference to preferred embodiment, the description is intended to be illustrative and not restrictive. It will be recognized that modifications to the invention can be made without departing from the spirit and scope thereof.

What is claimed is:

1. A transducer for transmitting ultrasound through flexible sheet material such as paper, or receiving ultrasound therefrom in an on-line application, comprising:
    (a) a piezoelectric element having the shape of a parallelepiped with corresponding dimensions of length, width, and thickness wherein length is greater than width and width is greater than thickness, and having an electrode film deposited on first and second surfaces whose dimensions are the length and width of the element, the dimensions of the element being selected so that when a voltage pulse is applied across the first and second surfaces, the element undergoes resonant vibration, predominantly in a direction parallel to the first and second surfaces; and
    (b) a nosepiece having a joining surface that is rigidly attached to the second surface, and having a contacting surface for contact with the sheet material.

2. A transducer as in claim 1 wherein the ratio of the length to the width of the element is at least two-to-one.

3. A transducer as in claim 2 wherein the length of at least a portion of the nosepiece bears substantially the same ratio to the length of the second surface as the speed of ultrasound through the nosepiece bears to the speed of ultrasound through the element.

4. A transducer for transmitting ultrasound into sheet material or receiving ultrasound therefrom in an on-line application, comprising:
    (a) a piezoelectric element having the shape of a parallelepiped with corresponding dimensions of length, width, and thickness wherein length is at least twice as great as width and width is greater than thickness and having an electrode film deposited on first and second surfaces whose dimensions are the length and width of the element; and
    (b) a nosepiece having a joining surface that is rigidly attached to the second surface, and having a contacting surface for contact with the sheet material, wherein the length of at least a portion of the nosepiece, said portion including the joining surface, bears substantially the same ratio to the length of the element as the speed of ultrasound through the nosepiece bears to the speed of ultrasound through the element.

5. A transducer as in claim 4 wherein the contacting surface is confined to a location that is near a longitudinal extreme of the transducer.

6. A transducer as in claim 5 wherein a portion of the nosepiece is rounded or beveled.

7. A transducer as in claim 6 wherein the contacting surface is rectangular.

8. A transducer as in claim 6 wherein the contacting surface is spherically convex.

9. A transducer as in claim 7 wherein the nosepiece is metallic.

10. A transducer for transmitting ultrasound through flexible sheet material such as paper, or receiving ultrasound therefrom in an on-line application, comprising:

(a) a piezoelectric element having the shape of a parallelpiped with corresponding dimensions of length, width, and thickness wherein length is greater than width and width is greater than thickness, and having an electrode film deposited on first and second surfaces whose dimensions are the length and width of the element, the dimensions of the element being selected so that when a voltage pulse is applied across the first and second surfaces, the element undergoes resonant vibration, predominantly in a direction parallel to the first and second surfaces; and (b) a nosepiece having a joining surface that is rigidly attached to the second surface, and having two separate contacting surfaces for simultaneous contact with the sheet material.

11. A transducer as in claim 10 wherein the ratio of the length to the width of the element is at least two-to-one.

12. A transducer for transmitting ultrasound into sheet material or receiving ultrasound therefrom in an on-line application, comprising:

(a) a piezoelectric element having the shape of a parallelepiped with corresponding dimensions of length, width, and thickness wherein length is at last twice as great as width and width is greater than thickness, and having an electrode film deposited on first and second surfaces whose dimensions are the length and width of the element; and (b) a nosepiece having a joining surface that is ridigly attached to the second surface, and having two separate contacting surfaces for simultaneous contact with the sheet material, wherein the length of at least a portion of the nosepiece bears substantially the same ratio to the length of the second surface as the speed of ultrasound through the nosepiece bears to the speed of ultrasound through the element.

13. A transducer as in claim 12 wherein the joining surface has a length that bears substantially the same ratio to the length of the element as the speed of ultrasound through the nosepiece bears to the speed of ultrasound through the element.

14. A transducer as in claim 13 wherein a portion of the nosepiece is rounded or beveled.

15. A transducer as in claim 14 wherein the contacting surfaces are spherically convex.

16. A transducer as in claim 15 wherein the nosepice is metallic.

17. A transducer, comprising:

(a) a piezoelectric element having the shape of a parallelpiped with corresponding dimensions of length, width, and thickness wherein length is greater than width and width is greater than thickness, and having an electrode film deposited on first and second surfaces whose dimensions are the length and width of the element, the dimensions of the element being selected so that when a voltage pulse is applied across the first and second surfaces, the element undergoes resonant vibration, predominantly in a direction parallel to the first and second surfaces; and (b) a nosepiece having a joining surface that is rigidly attached to the second surface, and having a contacting surface for contact with flexible medium through which ultrasound is propagated, wherein the joining surface does not entirely cover the second surface.

18. A transducer as in claim 17 wherein the ratio of the length to the width of the element is at least two-to-one.

19. A transducer as in claim 18 wherein the portion of the second surface that is not covered by the joining surface is covered by a non-conductive material.

* * * * *